US007708099B2

(12) United States Patent
Oodachi et al.

(10) Patent No.: US 7,708,099 B2
(45) Date of Patent: May 4, 2010

(54) MOTORCYCLE COOLANT RESERVOIR AND HEAT SHIELD

(75) Inventors: Yasuhiro Oodachi, Shizuoka (JP); Shigeto Yamasaki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 221 days.

(21) Appl. No.: 11/765,964

(22) Filed: Jun. 20, 2007

(65) Prior Publication Data

US 2007/0295547 A1 Dec. 27, 2007

(30) Foreign Application Priority Data

Jun. 23, 2006 (JP) ............................. 2006-174617
May 28, 2007 (JP) ............................. 2007-140778

(51) Int. Cl.
*B62J 23/00* (2006.01)
*B62K 11/04* (2006.01)

(52) U.S. Cl. .................................................. 180/229

(58) Field of Classification Search ................. 180/229
See application file for complete search history.

(56) References Cited

U.S. PATENT DOCUMENTS

| 2,781,859 | A | * | 2/1957 | Charles | 180/229 |
| 5,244,036 | A | * | 9/1993 | Michl | 165/300 |
| 5,845,618 | A | * | 12/1998 | Taue et al. | 123/317 |
| 6,296,073 | B1 | * | 10/2001 | Rioux et al. | 180/292 |
| 6,843,105 | B1 | * | 1/2005 | France | 73/31.05 |
| 6,910,546 | B2 | * | 6/2005 | Tsutsumi et al. | 180/219 |
| 6,971,438 | B2 | * | 12/2005 | Oki et al. | 165/41 |
| 7,140,329 | B2 | * | 11/2006 | Ohzono et al. | 123/41.1 |
| 2002/0112680 | A1 | * | 8/2002 | Oki et al. | 123/41.49 |
| 2006/0056191 | A1 | * | 3/2006 | Uemura et al. | 362/473 |
| 2006/0065455 | A1 | * | 3/2006 | Saiki et al. | 180/68.4 |
| 2007/0056791 | A1 | * | 3/2007 | Mano et al. | 180/229 |

FOREIGN PATENT DOCUMENTS

| JP | 59067119 A | * | 4/1984 |
| JP | 2005-069208 | | 3/2005 |

\* cited by examiner

*Primary Examiner*—Lesley Morris
*Assistant Examiner*—Wesley Potter
(74) *Attorney, Agent, or Firm*—Keating & Bennett, LLP

(57) ABSTRACT

A motorcycle that secures engine cooling efficiency while reducing exposure of a radiator. A reserve tank disposed below the seat and inward of an exhaust pipe in the vehicle width direction exchanges cooling water with the radiator. A first heat blocking cover is disposed between the exhaust pipe and the reserve tank. The first heat blocking cover has an access hole formed therein. A second heat blocking cover covers the access hole of the first heat blocking cover.

11 Claims, 9 Drawing Sheets

[Fig. 1]
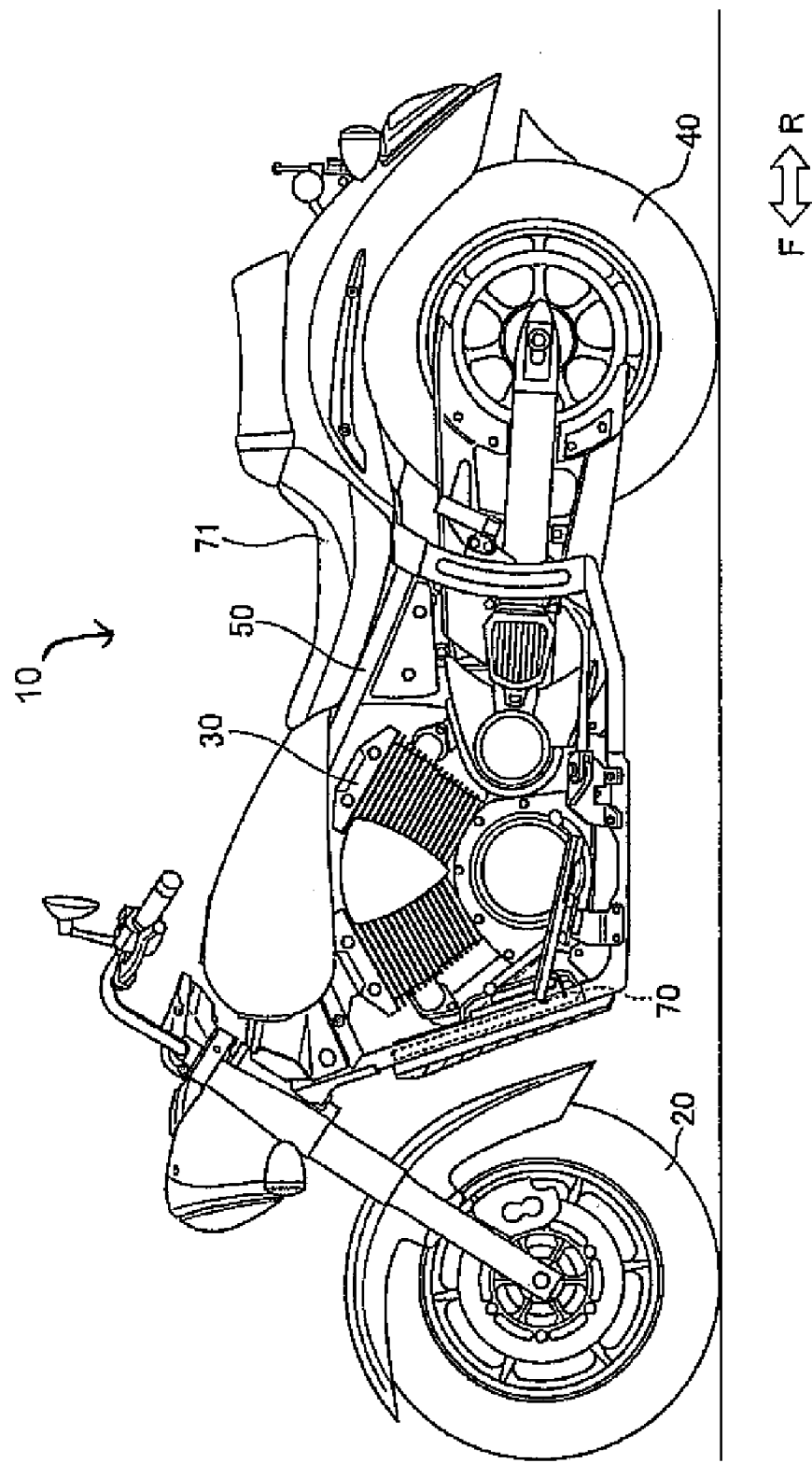

[Fig. 2]
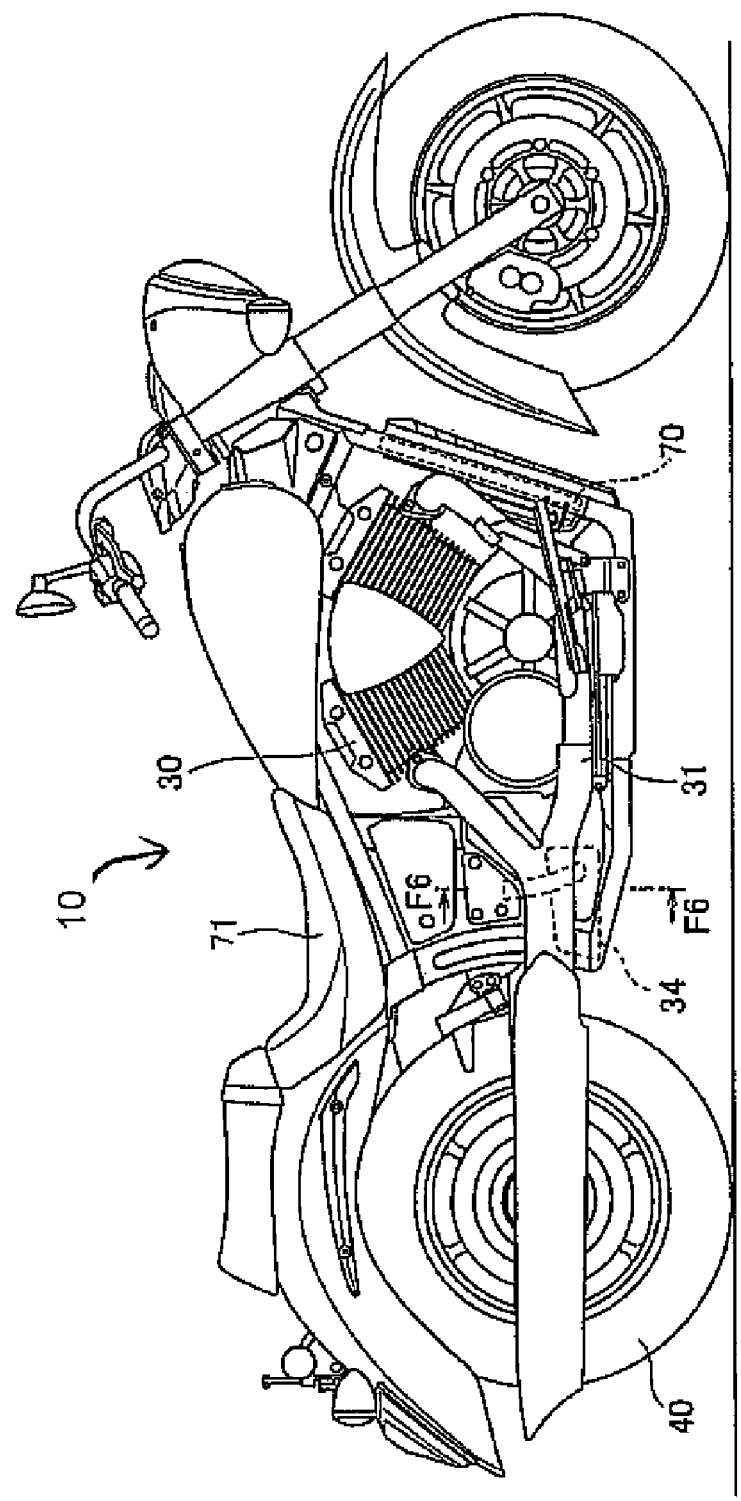

[Fig. 3]
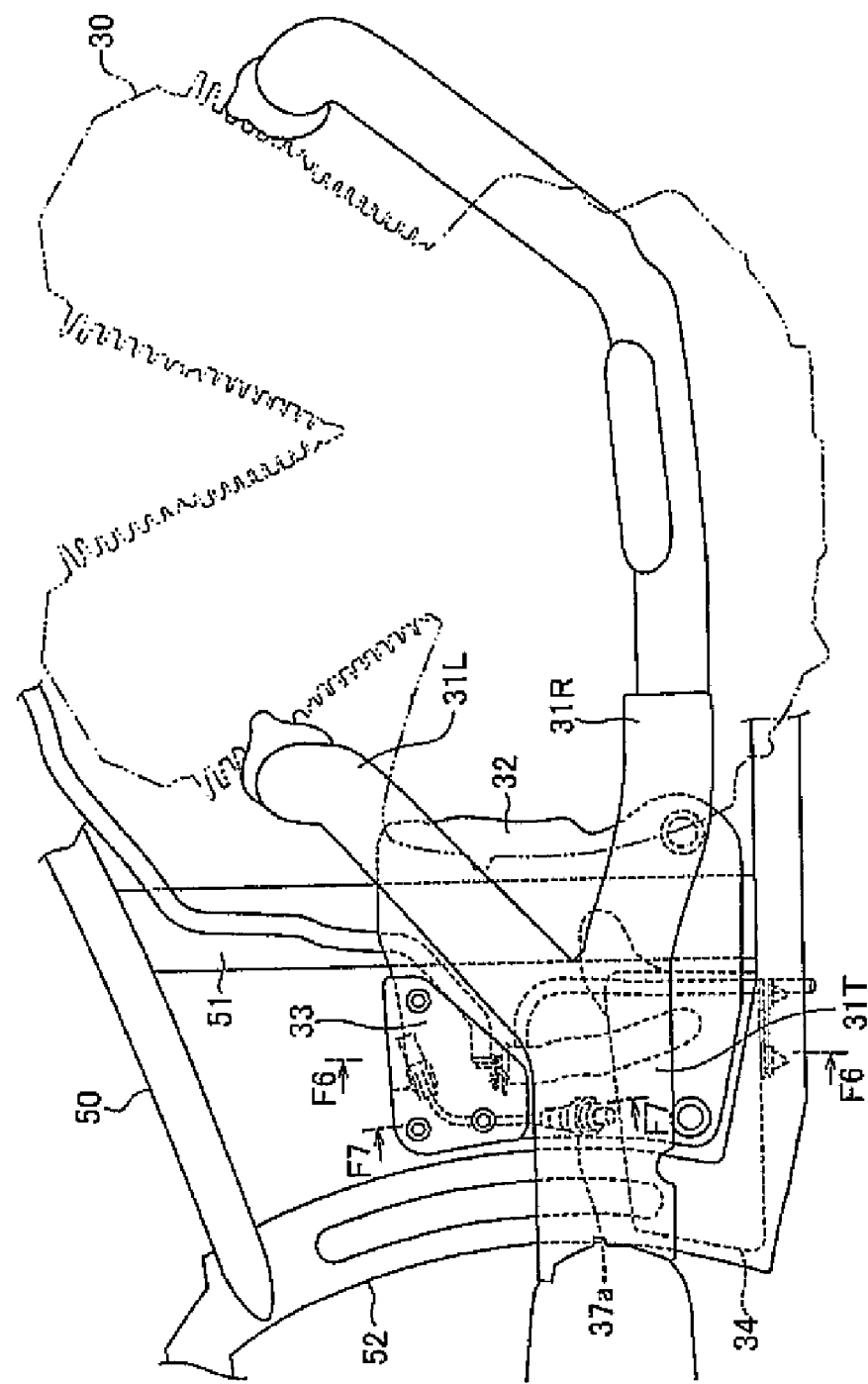

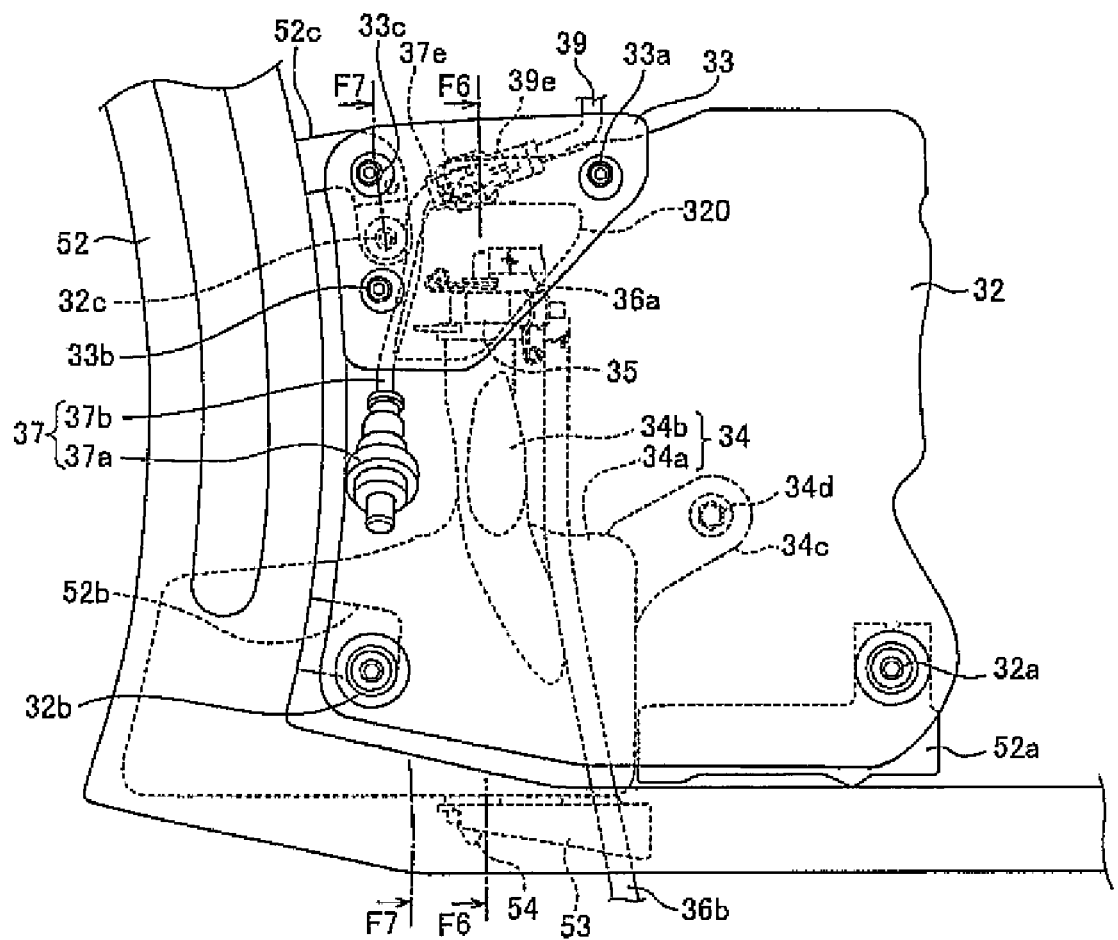
[Fig. 4]

[Fig. 5]
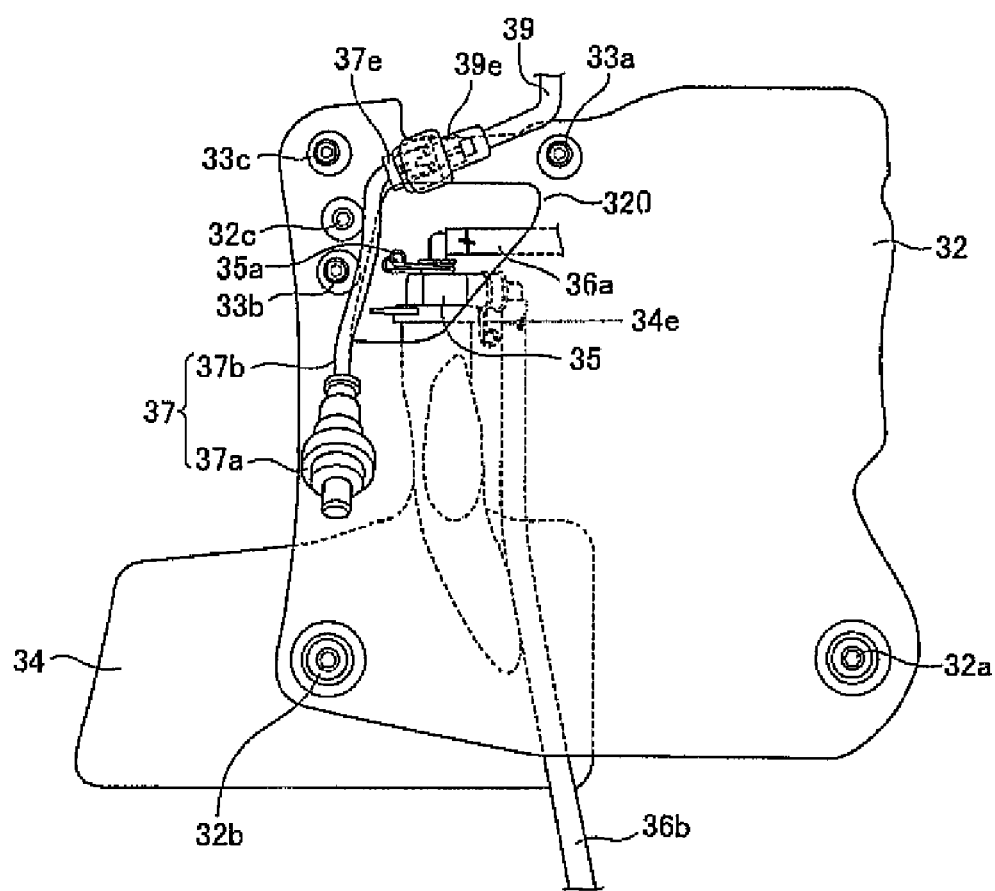

[Fig. 6]
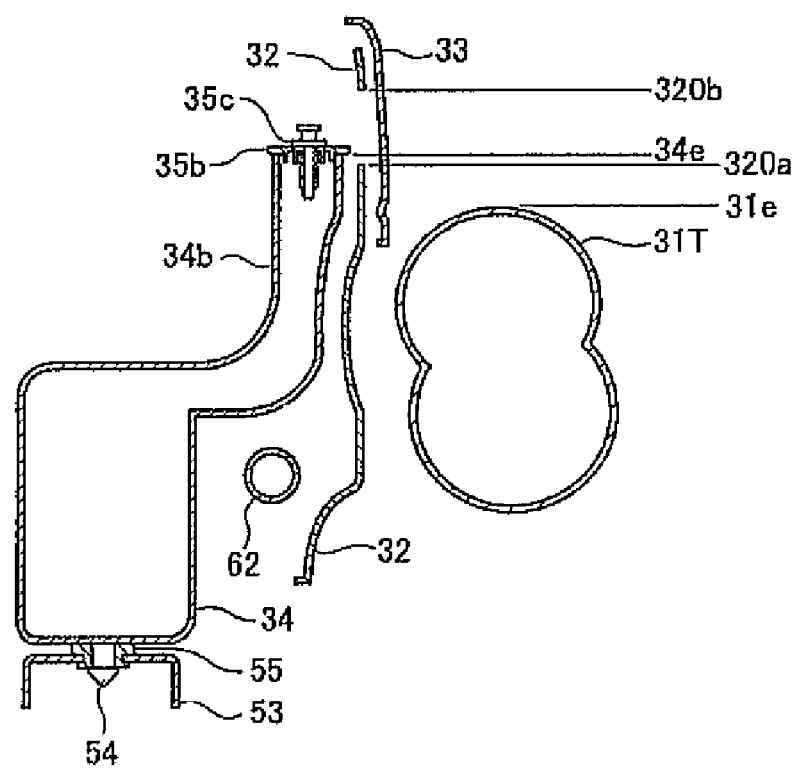

[Fig. 7]
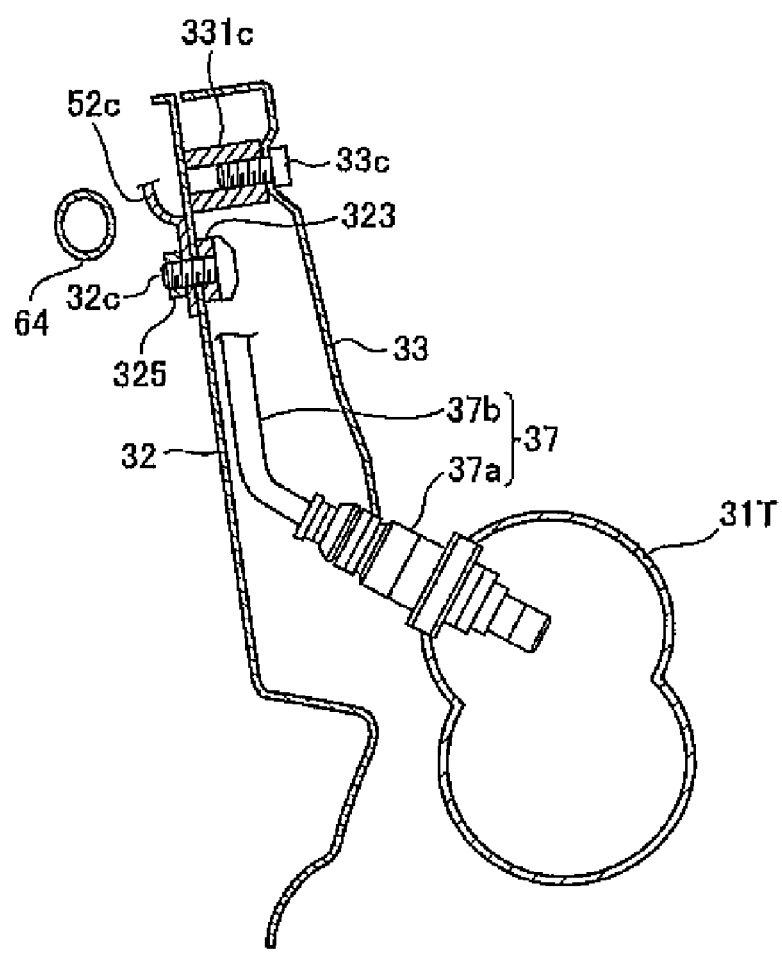

[Fig. 8]
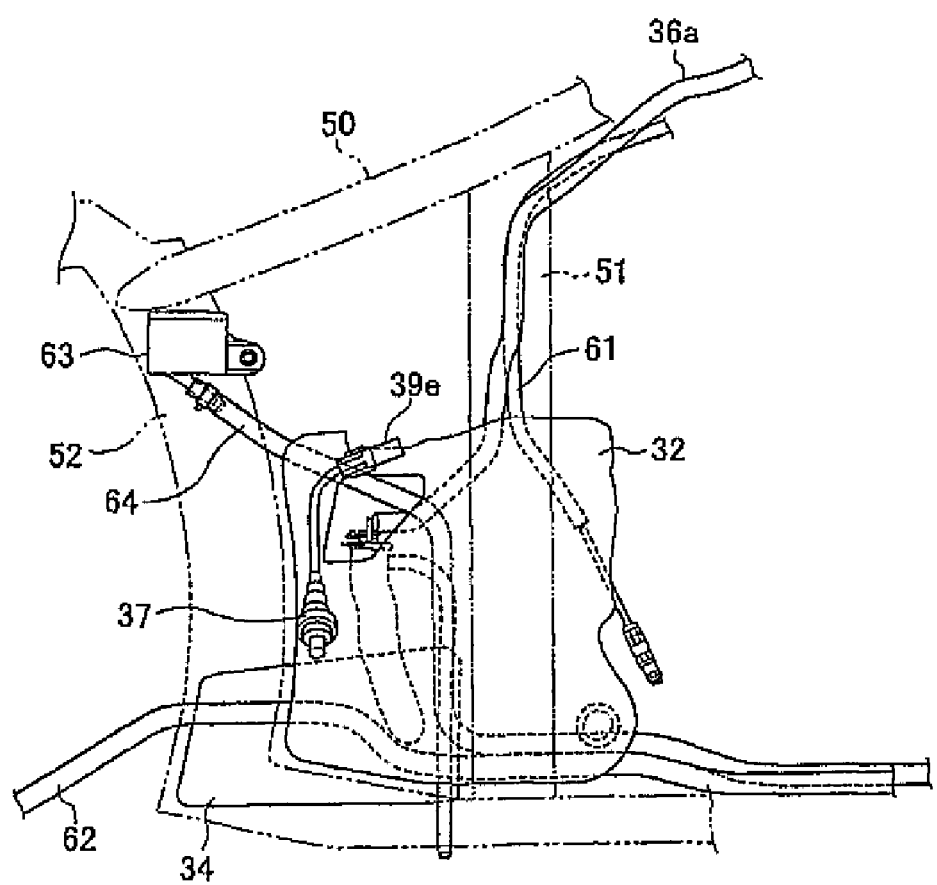

[Fig. 9]
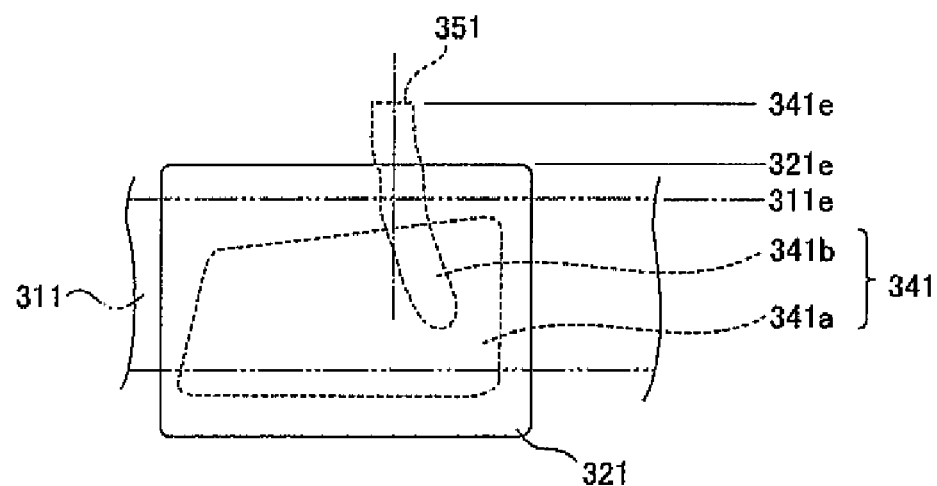
[Fig. 10]
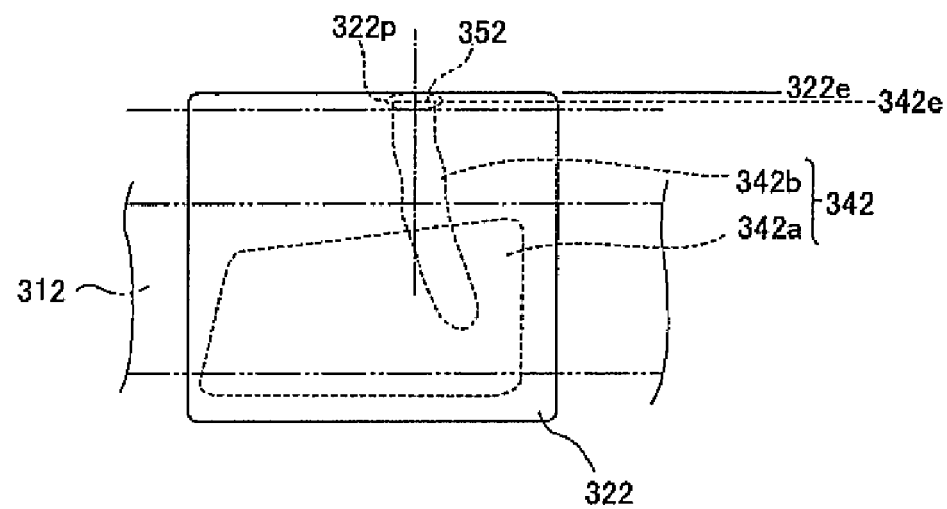

MOTORCYCLE COOLANT RESERVOIR AND HEAT SHIELD

RELATED APPLICATIONS

This application claims the benefit of priority under 35 USC 119 of Japanese patent application no. 2006-174617, filed on Jun. 23, 2006, and Japanese patent application no. 2007-140778, filed on May 28, 2007, which applications are hereby incorporated by reference in their entireties.

BACKGROUND OF THE INVENTION

1. Field of the Invention The present invention relates to a straddle-type vehicle, and in particular to a straddle-type vehicle having a reserve tank disposed below the seat.

2. Description of Related Art

A straddle-type vehicle known in the art includes an engine that drives a rear wheel, an exhaust pipe connected with the engine and extending toward the rear from the engine, a radiator, and a reserve tank that stores cooling water for the radiator (for example, see JP-A-2005-069208).

When the reserve tank included in this type of straddle-type vehicle has a large capacity, the reserve tank is disposed below a seat and inward of the exhaust pipe in the vehicle width direction. This space is sufficiently wide so as not to expose the reserve tank to the outside.

According to this straddle-type vehicle, however, the reserve tank is heated by the exhaust pipe which exhausts high-temperature gas produced from the engine.

To reduce heat transmitted from the exhaust pipe to the reserve tank, it is considered that a distance sufficient for avoiding transmission of heat from the exhaust pipe is provided between the exhaust pipe and the reserve tank. In this case, the length of the surroundings of the reserve tank disposed below the seat in the vehicle width direction increases, and therefore the foot of the rider cannot easily contact the ground.

SUMMARY OF THE INVENTION

The invention has been developed to solve these problems and provides a straddle-type vehicle that reduces heat transmitted from an exhaust pipe to a reserve tank that is disposed below a seat and inward of the exhaust pipe in the vehicle width direction.

A straddle-type vehicle according to one embodiment of the invention includes a rear wheel; an engine that drives the rear wheel; an exhaust pipe connected with the engine and extending toward the rear from the engine; a radiator disposed in front of the engine, which receives airflow caused by running of the vehicle; a seat disposed behind the engine; and a reserve tank disposed below the seat and inward of the exhaust pipe in the vehicle width direction to store cooling water for the radiator. A heat blocking cover is disposed between the exhaust pipe and the reserve tank.

According to the invention, the heat blocking cover is provided between the exhaust pipe and the reserve tank and therefore reduces heat transmitted to the reserve tank from the exhaust pipe.

In one embodiment, a siphon tube communicating with the radiator and the reserve tank is further provided. The reserve tank has a guide pipe connected with one end of the siphon tube; the one end of the siphon tube is connected with the upper end of the guide pipe. The heat blocking cover includes a first heat blocking cover; and the upper end of the first heat blocking cover is located at a position higher than the upper end of the guide pipe.

In one embodiment, the first heat blocking cover has an opening; and a lower end of the opening is located at a position lower than the upper end of the guide pipe.

In one embodiment, the heat blocking cover includes a second heat blocking cover that covers the opening.

In one embodiment, a siphon tube communicating with the radiator and the reserve tank is further provided. The reserve tank has a guide pipe connected with one end of the siphon tube; the one end of the siphon tube is connected with the upper end of the guide pipe. The heat blocking cover includes a first heat blocking cover; and the upper end of the first heat blocking cover is located at a position lower than the upper end of the guide pipe.

In one embodiment, a sensor unit that detects condition of exhaust gas flowing in the exhaust pipe, and a wire connected with the sensor unit are included; one end of the sensor unit is inserted into the exhaust pipe; and the other end of the sensor unit is connected with the wire in a region covered by the heat blocking cover.

In one embodiment, the heat blocking cover covers a region in which the reserve tank and the exhaust pipe overlap with each other as viewed from the side of the vehicle.

According to the invention, heat transmitted to the reserve tank from the exhaust pipe is reduced.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a left side view of a motorcycle according to an embodiment of the invention.

FIG. 2 is a right side view of the motorcycle.

FIG. 3 is a right side view of an enlarged part of the motorcycle.

FIG. 4 is a right side view of surroundings of a first heat blocking cover and a reserve tank of the motorcycle.

FIG. 5 is a right side view of the first heat blocking cover and the reserve tank.

FIG. 6 is a cross-sectional view taken along line F6-F6 of FIG. 4.

FIG. 7 is a cross-sectional view taken along line F7-F7 of FIG. 4.

FIG. 8 is a right side view of an enlarged part of the motorcycle.

FIG. 9 is a right side view of surroundings of an exhaust pipe, a first heat blocking cover and a reserve tank of a motorcycle according to another embodiment of the invention.

FIG. 10 is a right side view of surroundings of an exhaust pipe, a first heat blocking cover and a reserve tank of a motorcycle according to another embodiment of the invention.

DETAILED DESCRIPTION OF THE INVENTION

Embodiments of the invention are now described with reference to the drawings. Identical or similar reference numbers are given to identical or similar parts shown in the figures. It should be noted that the figures illustrate only schematic shapes, and proportions and the like of respective dimensions are different from actual values. Therefore, specific dimensions and the like should be judged from the following description. Moreover, parts having different dimensional relations and proportions between the figures are included.

Structure of Straddle-Type Vehicle According to Embodiment

A straddle-type vehicle according to the invention, embodied as a motorcycle 10, is illustrated in FIGS. 1 and 2. FIG. 1 is a left side view of motorcycle 10. FIG. 2 is a right side view of motorcycle 10. FIG. 3 is a right side view of an enlarged part of motorcycle 10.

Motorcycle 10 has a front wheel 20 and a rear wheel 40, and a V-type engine 30 that drives rear wheel 40. Motorcycle 10 is a so-called American-type motorcycle on which a rider sits with his or her legs spreading toward the front.

A radiator 70 is disposed in front of engine 30 and a seat 71 is disposed behind engine 30. Radiator 70 receives airflow caused by running of the vehicle. A reserve tank 34 storing cooling water for radiator 70 (FIG. 2) is provided below seat 71. Engine 30 is attached to a body frame 50 that forms a framework of motorcycle 10. As illustrated in FIG. 2, an exhaust pipe 31 is connected with and extends from engine 30 toward the rear.

As illustrated in FIG. 3, a first heat blocking cover 32 is disposed between exhaust pipe 31 and reserve tank 34 in the space surrounded by body frame 50, a body frame 51, and a body frame 52. Motorcycle 10 also has a second heat blocking cover 33.

Structure of Exhaust Pipe

The structure of exhaust pipe 31 is explained with reference to FIG. 3. As illustrated in FIG. 3, exhaust pipes 31L and 31R are connected with engine 30. Exhaust pipe 31 guides high-temperature exhaust gas exhausted from engine 30 toward a muffler (not shown) disposed in the rear area. More specifically, exhaust pipe 31R provided on V-type engine 30 extends from the front region of the front bank toward the rear of motorcycle 10. Exhaust pipe 31L extends from the rear region of the rear bank toward the rear of motorcycle 10. Thus, exhaust pipe 31 includes exhaust pipe 31R connected with the front region of engine 30 and extending toward the rear, and exhaust pipe 31L connected with the rear region of engine 30 and extending toward the rear. Exhaust pipes 31L and 31R are joined into one body as an exhaust pipe 31T at a position below seat 71 (see FIG. 1) and between body frame 51 and body frame 52. Thus, exhaust pipe 31 is constituted by exhaust pipe 31L, exhaust pipe 31R, and exhaust pipe 31T.

Exhaust pipe 31T extends along the left side of motorcycle 10 toward the rear. An $O_2$ sensor main body of an $O_2$ sensor unit 37 (see FIG. 4) is disposed on exhaust pipe 31T between body frame 51 and body frame 52.

(Structure of Reserve Tank)

The structure of reserve tank 34 is discussed with reference to FIGS. 3 and 4. FIG. 4 is a right side view of enlarged surroundings of first heat blocking cover 32 and reserve tank 34. Exhaust pipe 31 is not shown in FIG. 4 to clarify the position of reserve tank 34.

As illustrated in FIG. 3, reserve tank 34 is disposed inward of exhaust pipe 31 in the vehicle width direction. Reserve tank 34 is positioned on the side of exhaust pipe 31T. As illustrated in FIG. 4, reserve tank 34 has a storage area 34a for storing cooling water flowing inside radiator 70 (see FIG. 1), and a guide pipe 34b for introducing cooling water to storage area 34a.

The term "cooling water" as used herein includes cooling fluid circulating within engine 30 and the cooling system such as radiator 70. Thus, "cooling water" herein refers to any cooling medium circulating within the cooling system to transfer heat.

A screw 35 for tightening a water supply port of guide pipe 34b is provided at an upper end 34e of guide pipe 34b (see FIG. 5). A siphon tube 36a connected with radiator 70, and a breather tube 36b directed to the outside of motorcycle 10, are equipped at guide pipe upper end 34e.

Siphon tube 36a communicates with radiator 70 and reserve tank 34. Cooling water flows in siphon tube 36a. One end of siphon tube 36a is connected with guide pipe upper end 34e. Siphon tube 36a guides the cooling water from radiator 70 to reserve tank 34 when the pressure of radiator 70 reaches or exceeds a predetermined value. Siphon tube 36a returns the cooling water from reserve tank 34 to radiator 70 when the cooling water in radiator 70 is cooled and the pressure of radiator 70 becomes negative.

Reserve tank 34 is supported by a stay 34c connected with body frame 51 (see FIG. 3) and a bracket 53 connected with body frame 52. An attachment hole is formed on each of stay 34c and body frame 52 (see FIG. 3). A reserve tank attachment screw 34d (screw member) is inserted through the attachment holes of body frame 52 and stay 34c to connect reserve tank 34 and body frame 52.

A rivet hole is formed on bracket 53. A rivet fastener 55 (see FIG. 6) is inserted through the rivet hole of bracket 53. A rivet 54 is provided on the bottom of reserve tank 34 and is connected with rivet fastener 55 to connect reserve tank 34 and bracket 53.

(Structure of Heat Blocking Cover)

The structure of the heat blocking cover (first heat blocking cover 32 and second heat blocking cover 33) is described with reference to FIGS. 4 and 5. FIG. 4 is a partial right side view of the surroundings of first heat cover 32 and reserve tank 34. FIG. 4 omits many components other than first heat blocking cover 32 and reserve tank 34 in order to clarify their positions. FIG. 5 is a right side view of first heat blocking cover 32 and reserve tank 34.

First heat blocking cover 32 overlaps with exhaust pipe 31 (see FIG. 3) as viewed from the side of motorcycle 10, and is disposed between exhaust pipe 31 and reserve tank 34. First heat blocking cover 32 has a service hole 32o at a position overlapping with guide pipe upper end 34e as viewed from the side of motorcycle 10. According to this embodiment, first heat blocking cover 32 is provided on the side of reserve tank 34 throughout the area between exhaust pipe 31 and reserve tank 34 except for the regions where body frame 52 and service hole 32o are provided.

First heat blocking cover 32 is supported by stay 52a, stay 52b and stay 52c connected with body frame 52. An attachment hole is formed on each of stay 52a and first heat blocking cover 32. A first heat blocking cover attachment screw 32a (screw member) is inserted through the attachment holes of first heat blocking cover 32 and stay 52a to connect first heat blocking cover 32 and stay 52a. Similarly, an attachment hole (not shown) is formed on each position of first heat blocking cover 32 corresponding to stays 52b and 52c. Thus, stays. 52b and 52c are connected with first heat blocking cover 32 via first heat blocking cover attachment screws 32b and 32c.

Second heat blocking cover 33 covers service hole 32o as viewed from the side of motorcycle 10. Second heat blocking cover 33 is connected with stays (see FIG. 7) fixed to first heat blocking cover 32, via second heat blocking cover attachment screws 33a, 33b and 33c.

Second heat blocking cover 33 covers a part of a first wire 37b of $O_2$ sensor unit 37, a first terminal 37e as the end of $O_2$ sensor unit 37 connected with first wire 37b, a second terminal 39e connected with first terminal 37e, and a part of a second wire 39 connected with second terminal 39e and extending toward the inside of motorcycle 10.

The region covered by second heat blocking cover 33 is further explained with reference to FIG. 5. As illustrated in FIG. 5, service hole 320 used for maintenance, first terminal 37e, and second terminal 39e are disposed in the region covered by second heat blocking cover 33. Guide pipe upper end 34e of guide pipe 34b of reserve tank 34 located in the region covered by second heat blocking cover 33 is exposed to the side of motorcycle 10 through service hole 320.

One end of siphon tube 36a is connected with the upper end of the guide pipe, and the connecting area between siphon tube 36a and the guide pipe is fastened by a clip 35a.

(Positional Relation Between Exhaust Pipe, Reserve Tank and Heat Blocking Cover)

The positional relation between exhaust pipe 31, reserve tank 34, first heat blocking cover 32, and second heat blocking cover 33 is discussed with reference to FIG. 6. FIG. 6 is a cross-sectional view taken along line F6-F6 of FIGS. 2, 3 and 4. More specifically, FIG. 6 is a guide pipe cross section in the vehicle width direction passing guide pipe upper end 34e of reserve tank 34.

As illustrated in FIG. 6, a service hole upper end 320b is located at a position higher than guide pipe upper end 34e. A service hole lower end 320a is located at a position lower than guide pipe upper end 34e and higher than an exhaust pipe upper end 31e.

The rivet hole (not shown) is formed on bracket 53 below reserve tank 34. Rivet 54 is provided on the bottom of reserve tank 34. Rivet fastener 55 is fixed to the rivet hole of bracket 53.

A brake hose 62 filled with brake fluid is provided inward of first heat blocking cover 32 of motorcycle 10 in the vehicle width direction. Brake hose 62 extends in the direction toward rear wheel 40.

As illustrated in FIG. 6, a sealing cap 35b is attached to guide pipe upper end 34e to prevent overflow of the cooling water. An insertion pipe 35c inserted through sealing cap 35b is connected with siphon tube 36a such that the cooling water can be introduced from siphon tube 36a to reserve tank 34 and from reserve tank 34 to siphon tube 36a.

(Structure of Peripheral Components of Heat Blocking Cover)

The structure of peripheral components of the heat blocking cover (first heat blocking cover 32 and second heat blocking cover 33) is explained with reference to FIGS. 7 and 8. FIG. 7 is a cross-sectional view taken along line F7-F7 of FIGS. 3 and 4. FIG. 8 is a right side view of surroundings of first heat blocking cover 32 and reserve tank 34. In FIG. 8, exhaust pipe 31 is not shown so as to clarify the positions of the peripheral components of the heat blocking cover, and body frames 50, 51 and 52 are shown by dotted lines.

As illustrated in FIG. 7, $O_2$ sensor main body 37 as the end portion of $O_2$ sensor unit 37 for detecting the condition of exhaust gas flowing within exhaust pipe 31T is inserted into exhaust pipe 31. $O_2$ sensor main body 37 measures the temperature and the oxygen concentration of the exhaust gas flowing in exhaust pipe 31, for example.

First heat blocking cover 32 is inserted into a screw fixture 325 via a spacer 323, an attachment hole of first heat blocking cover 32, and an attachment hole of stay 52c and fixed to screw fixture 325 using first heat blocking cover attachment screw 32c.

Second heat blocking cover 33 is inserted into a stay 331c connected with first heat blocking cover 32 and fixed to stay 331c using second heat blocking cover attachment screw 33c.

A reserve hose 64 filled with brake fluid and extending from a reserve tank 63 storing brake fluid (see FIG. 8) is disposed inward of first heat blocking cover 32 of motorcycle 10.

As illustrated in FIG. 8, a clutch wire 61 connected with a clutch lever (not shown) and a clutch (not shown), brake hose 62, and reserve hose 64 are located inward of first heat blocking cover 32 of motorcycle 10.

(Operation and Advantage)

According to the invention, first heat blocking cover 32 is disposed between exhaust pipe 31 and reserve tank 34 of motorcycle 10. Thus, first heat blocking cover 32 blocks heat transmitted from exhaust pipe 31 to reserve tank 34, and reduces the heat effect exerted to reserve tank 34 by exhaust pipe 31. Accordingly, motorcycle 10 which has reserve tank 34 below seat 71 inward of exhaust pipe 31T in the vehicle width direction reduces heat transmitted from exhaust pipe 31T to reserve tank 34.

Moreover, first heat blocking cover 32 is located at a position higher than guide pipe upper end 34e of guide pipe 34b. Service hole 320 is formed on first heat blocking cover 32, and service hole lower end 320a of the first heat blocking cover is located at a position lower than guide pipe upper end 34e on a cross section of guide pipe 34b in the vehicle width direction (FIG. 6). Thus, guide pipe 34 is exposed to the side of motorcycle 10 through service hole 320, resulting in facilitation of water supply to reserve tank 34.

In this case, it is only required that this positional relation is satisfied on the cross section of guide pipe 34b in the vehicle width direction. For example, when service hole 320 extends in the front-rear direction of the vehicle and the lower end of service hole 320 is located at a position higher than guide pipe upper end 34e so that other equipment exposed via the service hole can be used, efficiency of work using guide pipe 34b is not lowered.

Second heat blocking cover 33 covering service hole 320 covers guide pipe 34b exposed via service hole 320 as viewed from the side of motorcycle 10. Thus, second heat blocking cover 33 improves the external appearance of motorcycle 10 while reducing the heat effect exerted to guide pipe 34b by exhaust pipe 31.

When second heat blocking cover 33 is removed, guide pipe upper end 34e is exposed. Thus, operations such as detaching second terminal 39e from first terminal 37e and water supply can be performed in the area around guide pipe upper end 34e.

Service hole upper end 320b is disposed at a position higher than guide pipe upper end 34e, and service hole lower end 320a is disposed at a position lower than guide pipe upper end 34e on the cross section of guide pipe 34b in the vehicle width direction. Thus, guide pipe upper end 34e is securely exposed through the service hole.

Service hole lower end 320a is located at a position higher than exhaust pipe upper end 31e on the cross section of guide pipe 34b in the vehicle width direction. Thus, first heat blocking cover 32 is disposed between guide pipe 34b and exhaust pipe 31T to reduce the heat effect given to reserve tank 34 from exhaust pipe 31T.

According to the invention, clutch wire 61, brake hose 62, and reserve hose 64 are located inward of first heat blocking cover 32. This structure improves the external appearance of motorcycle 10 while reducing heat effect to clutch wire 61, brake hose 62, and reserve hose 64 from exhaust pipe 31.

OTHER EXAMPLES

While an embodiment according to the invention has been described, the invention is not limited to this particular description and depiction. It will be obvious to those skilled in the art that various alternatives according to the invention may be practiced in light of the teachings of this disclosure.

For example, according to the above embodiment, first heat blocking cover 32 has service hole 320, and guide pipe upper end 34e is exposed through service hole 320. However, according to an example shown in FIG. 9, a first heat blocking cover upper end 321e of a first heat blocking cover 321 is located below a guide pipe upper end 341e of a guide pipe 341b.

According to this motorcycle, guide pipe upper end 341e is positioned above first heat blocking cover upper end 321e, and thus is exposed to the side of the motorcycle. Therefore, water supply to a reserve tank 341 can be facilitated without prevention by first heat blocking cover 321.

In this case, it is only required that this positional relation is satisfied on the cross section of guide pipe 341b in the vehicle width direction. For example, when first heat blocking cover 321 extends in the front-rear direction of the vehicle and the upper end of the first heat blocking cover is located at a position higher than guide pipe upper end 341e so that other equipment exposed via the service hole can be used, efficiency of work using guide pipe 341b is not lowered.

First heat blocking cover upper end 321e is positioned above an exhaust pipe upper end 311e on a cross section of guide pipe 341b in the vehicle width direction. Thus, first heat blocking cover 321 is disposed between guide pipe 341b and exhaust pipe 311 to securely reduce the heat effect exerted to reserve tank 341b by exhaust pipe 311.

More specifically, it is possible to facilitate water supply to reserve tank 341 while reducing heat effect given to reserve tank 341 from exhaust pipe 311. In this case, a cover for covering guide pipe 341b easily detachable and exposed to the side of motorcycle 10 is provided. This cover improves the external appearance by eliminating the exposure of guide pipe 341b.

For example, according to the above embodiment, first heat blocking cover 32 has service hole 320, and guide pipe upper end 34e is exposed through service hole 320.

According to an example shown in FIG. 10, a first heat blocking cover 322 extends above a guide pipe 342b, and is positioned above a guide pipe upper end 342e of guide pipe 342b. According to this motorcycle, first heat blocking cover 322 can cover the entire part of a reserve tank 342 as viewed from the side of the vehicle. Thus, exposure of reserve tank 342 is suppressed, and heat effect given to reserve tank 342 from exhaust pipe 312 is reduced. Particularly, heat effect exerted to guide pipe 342b is further lowered.

Additionally, according to this example, guide pipe upper end 342e is located at a position overlapping with a first heat blocking cover upper end portion 322p including a first heat blocking cover upper end 322e as viewed from the side of the motorcycle.

When the first heat blocking cover further extends toward above providing a long distance between the first heat blocking cover upper end portion and the guide pipe upper end, water supply to a reserve tank becomes difficult. According to this example, however, guide pipe upper end 342e is disposed at a position overlapping with first heat blocking cover upper end portion 322p as viewed from the side of the motorcycle. Thus, ease of water supply to reserve tank 342 is maintained.

Moreover, as in the example illustrated in FIG. 10, first heat blocking cover 322 may cover the entire region where reserve tank 342 overlaps with exhaust pipe 312 as viewed from the side of the motorcycle. In this case, since first heat blocking cover 322 covers the overall region where reserve tank 342 and exhaust pipe 312 overlap with each other as viewed from the side of the motorcycle, heat effect exerted to reserve tank 342 by exhaust pipe 312 is further reduced.

Furthermore, as in the example illustrated in FIG. 10, first heat blocking cover 322 may cover all of reserve tank 342 as viewed from the side of the motorcycle. This structure improves the external appearance by eliminating exposure of reserve tank 342.

In the above embodiment, service hole lower end 320a is located below guide pipe upper end 34e. However, service hole lower end 320a may be disposed at a position approximately at the equal level or slightly higher than that of guide pipe upper end 34e. In this case, since the region of guide pipe 34b covered by first heat blocking cover 32 increases, the heat effect to guide pipe 34b is further reduced while maintaining ease of replacement of cooling water in reserve tank 34 and water supply to reserve tank 34.

In the above embodiment, guide pipe 34b is located in the upper region of reserve tank 34. However, guide pipe 34b may be positioned on the side or in the lower region of reserve tank 34. In this case, the advantage of the invention is still provided as long as guide pipe upper end 34e is located in the upper region of reserve tank 34.

As discussed above, it is apparent that the invention includes various modifications or the like not described herein. It is therefore understood that the technical scope of the invention is only limited by the specific matters of the invention within the scope of the appended claims which are adequately claimed according to the above description.

The invention claimed is:

1. A straddle-type vehicle comprising:
    a rear wheel;
    an engine arranged to drive the rear wheel;
    an exhaust pipe connected to the engine and extending rearward from the engine;
    a radiator disposed in front of the engine and arranged to receive airflow generated by running of the vehicle;
    a seat disposed behind the engine;
    a reserve tank disposed below the seat and inward of the exhaust pipe in a vehicle width direction to store cooling water for the radiator; and
    a heat blocking cover disposed between the exhaust pipe and the reserve tank; wherein
    the heat blocking cover includes a first heat blocking cover and a second heat blocking cover;
    the first heat blocking cover includes an opening through which a portion of the reserve tank is exposed;
    the second heat blocking cover covers the opening;
    the reservoir tank includes a storage portion and a guide pipe extending upward from the storage portion;
    an upper end of the guide pipe is in communication with the radiator; and
    the upper end of the guide pipe is exposed through the opening in the first heat blocking cover.

2. The straddle-type vehicle according to claim 1, further comprising:
    a siphon tube arranged to communicate with the radiator and the reserve tank; wherein
    the upper end of the guide pipe is connected to one end of the siphon tube; and an upper end of the first heat blocking cover is located at a position higher than the upper end of the guide pipe.

3. The straddle-type vehicle according to claim 2, wherein:
a lower end of the opening is located at a position lower than the upper end of the guide pipe.

4. The straddle-type vehicle according to claim 3, wherein the lower end of the opening is located at a position higher than an upper surface of the exhaust pipe.

5. The straddle-type vehicle according to claim 1, wherein the second heat blocking cover is fixed to the first heat blocking cover.

6. The straddle-type vehicle according to claim 1, further comprising:
a siphon tube arranged to communicate with the radiator and the reserve tank, wherein
the upper end of the guide pipe is connected to one end of the siphon tube; and
an upper end of the first heat blocking cover is located at a position lower than the upper end of the guide pipe.

7. The straddle-type vehicle according to claim 1, further comprising:
a sensor unit arranged to detect a condition of exhaust gas flowing in the exhaust pipe, and a wire connected with the sensor unit; wherein
a first end of the sensor unit is inserted into the exhaust pipe; and
a second end of the sensor unit is connected with the wire in a region covered by the heat blocking cover.

8. The straddle-type vehicle according to claim 1, wherein the heat blocking cover covers a region in which the reserve tank and the exhaust pipe overlap with each other as viewed from a side of the vehicle.

9. The straddle-type vehicle according to claim 1, further comprising a brake hose provided inward of the heat blocking cover in the vehicle width direction.

10. The straddle-type vehicle according to claim 1, further comprising a clutch wire provided inward of the heat blocking cover in the vehicle width direction.

11. The straddle-type vehicle according to claim 1, wherein
the vehicle includes a frame including at least a first frame portion that extends substantially vertically and a second frame portion that extends substantially horizontally; and
the first heat blocking cover is connected to both the first frame portion and the second frame portion.

* * * * *